W. WELCHES.
HOBBLE.
APPLICATION FILED JULY 21, 1913.
1,130,049.
Patented Mar. 2, 1915.
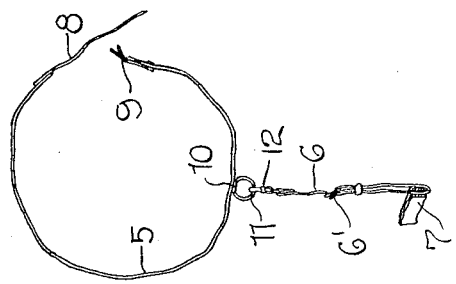
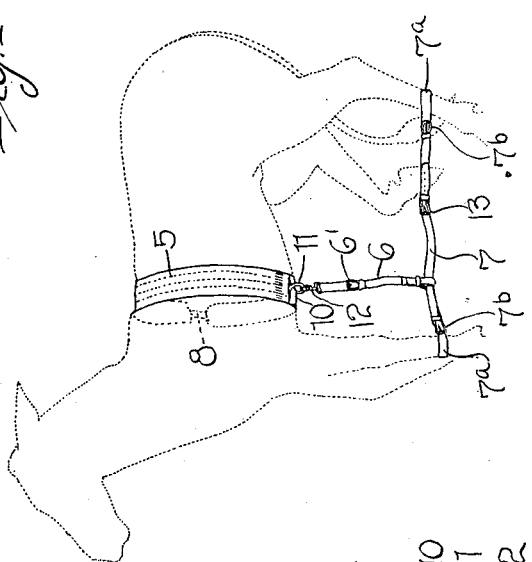
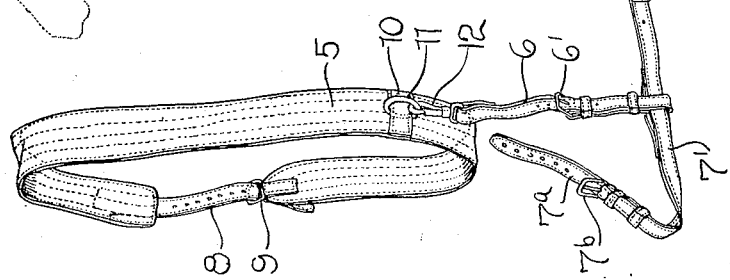
Inventor
WILLIAM WELCHES
Witnesses
Robert M. Sutphen
A. J. Hurd
By Watson E. Coleman
Attorney

UNITED STATES PATENT OFFICE.

WILLIAM WELCHES, OF NEAR WAYMANSVILLE, INDIANA.

HOBBLE.

1,130,049.  Specification of Letters Patent.  Patented Mar. 2, 1915.

Application filed July 21, 1913.  Serial No. 780,317.

*To all whom it may concern:*

Be it known that I, WILLIAM WELCHES, a citizen of the United States, residing in the county of Brown, State of Indiana, near Waymansville, county of Bartholomew, and State of Indiana, have invented certain new and useful Improvements in Hobbles, of which the following is a specification, reference being had to the accompanying drawings.

This invention relates to hobbles, and it more particularly relates to an improved form of animal controlling devices for horses, mules and cattle.

An object of the invention is to provide a hobble which will effectually prevent any of the domesticated quadrupeds from jumping over fences, and to prevent horses from kicking up while being driven; so as to effectually break such animal from attempting to kick or jump.

Another object is to provide a device of this character which is simple of construction, comparatively inexpensive, strong, durable, adjustable to fit animals of different sizes, and thoroughly practical and effective for the purpose intended.

In the accompanying drawings, which supplement this specification, Figure 1 illustrates the device applied to an animal, the latter being shown in dotted lines; Fig. 2 is an enlarged vertical sectional view of the device; and Fig. 3 is an enlarged perspective view thereof.

In these drawings, in which similar reference characters correspond with similar parts throughout the several views, the device consists of a girth-like band 5, a supporting strap 6, and a hobble member 7. The band 5 is preferably formed of a piece of fabric webbing having a leather strap 8 secured to one end and having a buckle 9 secured to its other end, whereby adjustment to animals of different sizes is easily accomplished. A cross strap 10 has both of its ends secured to the web 5, and supports a ring 11, into which a snap hook 12 engages, said snap hook being secured to one end of the supporting strap 6, while the other end of said supporting strap is secured to the medial portion of the member 7. The supporting strap is provided with a buckle 6' by which it is rendered adjustable for lengthening and shortening it.

The member 7 consists of two elements which are adjustably connected by means of a buckle 13, the front hobble element 7' being provided with a front leg-engaging element 7$^a$ which engages with a buckle 7$^b$ and co-acts therewith to form a loop which is adapted to be tightly buckled around the front leg of the animal, as illustrated. The rear leg-engaging member 7$^c$ is also provided with a buckle 7$^b$ and with an element 7$^a$ which is adapted to be formed into a loop which is buckled around the rear leg of the animal.

It will be seen that the members 5 and 6 effectually support the middle portion of the hobble member 7, for preventing it from dragging upon the ground and becoming entangled with the non-hobbled legs of the animal.

It will be seen that I have provided a device of this character which is fully capable of attaining the foregoing objects in a thoroughly practical manner.

While the accompanying drawings illustrate what I believe to be the preferred embodiment of my invention, it is to be understood that the invention is not limited thereto, but that various changes may be made in the construction, arrangement and proportion of the parts without departing from the scope of the invention, as defined in the appended claim.

I claim:

A device of the character described including a girth, a strap member having its extremities provided with leg engaging means adapted to be engaged by a front and rear leg, a ring, a cross strap secured to the girth and disposed through the ring, an auxiliary strap having one extremity formed into an adjustable loop through which the strap member loosely extends, and a hook carried by the opposite extremity of the auxiliary strap for detachable engagement with the ring of the girth.

In testimony whereof I hereunto affix my signature in the presence of two witnesses.

WILLIAM WELCHES.

Witnesses:
 ELIZA E. BECK,
 JOHN M. PLUMMER.

Copies of this patent may be obtained for five cents each, by addressing the "Commissioner of Patents, Washington, D. C."